July 15, 1924.

M. M. IRVINE

CUTTING DISK

Filed Jan. 12, 1924

1,501,780

INVENTOR
M. M. IRVINE,
BY
ATTORNEY

Patented July 15, 1924.

1,501,780

UNITED STATES PATENT OFFICE.

MALCOLM MILLER IRVINE, OF GLASGOW, SCOTLAND.

CUTTING DISK.

Application filed January 12, 1924. Serial No. 685,862.

*To all whom it may concern:*

Be it known that I, MALCOLM MILLER IRVINE, of 26 India Street, Glasgow, Scotland, a subject of the King of Great Britain, have invented certain new and useful Improvements Relating to Cutting Disks, of which the following is a specification.

This invention relates to cutting disks as used in coal cutting and like machines.

In the customary design of coal cutting disks a race is provided as an integral part of the disk casting, such race constituting a guide for a brass sweep which acts as a steadying device for the disk. During normal use the friction of the sweep gradually wears away the race and, under stress, the race is liable to crack and break in pieces.

In accordance with the present invention these objections are overcome by using a forged iron or steel race in place of the usual cast metal race, the forged iron or steel race being welded to the disk in suitable manner. The invention can be applied in the construction of new disks, the casting being made suitable for the incorporation, by welding, of the forged iron or steel race and it can also be applied to the repair of worn disks, the worn race being entirely removed and a new race of forged iron or steel welded to the disk in its place.

Figure 1:
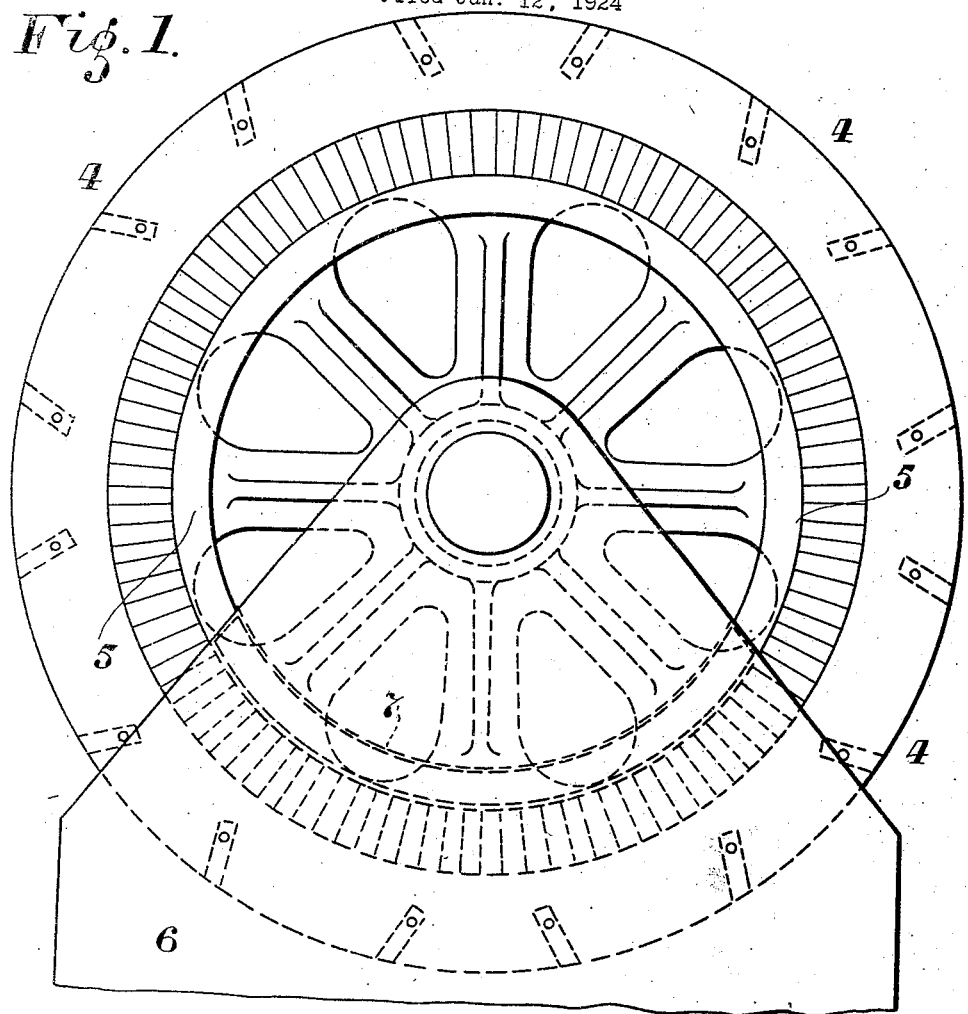
Figure 2:
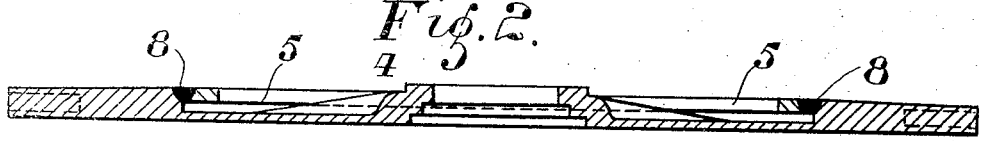
Figure 3:
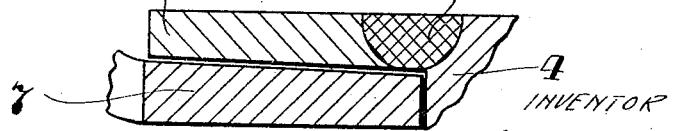

In order that the invention may be clearly understood one form is illustrated, by way of example, on the accompanying drawing whereon Fig. 1 is a plan showing the disk, Fig. 2 a medial section through the disk, and Fig. 3 an enlarged detail view showing the weld between the forged race and the disk.

On the drawing, the reference 4 denotes the disk and 5 the race. In practice the disk is mounted for rotation between jib plates 6 and the race 5 forms a guide for a brass sweep segment 7, the latter being attached to the jib plate by a suitable bracket and serving, in known manner, as a steadying device for the disk during its rotation.

Instead of the race being cast integral with the disks as heretofore, it is made of forged iron or steel and is welded to the disk, as shown at 8 in Figs. 2 and 3.

When the race 5 is made of forged iron or steel welded to the disk as described, it is not liable to crack and break in pieces under stress as is the cast race and, moreover, it is better able to withstand the wear caused by its contact with the brass sweep 7.

Having now fully described my invention what I claim and desire to secure by Letters Patent is:—

1. In a coal cutting or like cutting machine, a cutting disk having a forged metal race welded thereto.

2. In a coal cutting or like cutting machine, a cutting disk comprising a casting and a forged metal race welded to the casting.

3. In a coal cutting or like machine, the combination of a cutting disk, gib plates between which the disk is mounted for rotation, a race welded to the cutting disk to form a guide, and a sweep attached to one of the gib plates and engaging said guide to act as a steadying device for the disk during its rotation.

4. As a new article of manufacture a cast cutting disk having a forged metal race welded thereto.

In testimony whereof I affix my signature in presence of two witnesses.

MALCOLM MILLER IRVINE.

Witnesses:
STANLEY DUNLOP,
EDITH MARY ROLLO.